US012591362B2

(12) United States Patent
Cody et al.

(10) Patent No.: US 12,591,362 B2
(45) Date of Patent: Mar. 31, 2026

(54) ADJACENT CAPACITIVE TOUCH SCREEN EVENT TRACKING

(71) Applicant: Huawei Technologies Co., Ltd., Shenzhen (CN)

(72) Inventors: Roya Allison Cody, Toronto (CA); Wei Li, Markham (CA); Che Yan, Kanata (CA); Wei Zhou, Kanata (CA); Kushagra Goel, Toronto (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 166 days.

(21) Appl. No.: 18/412,038

(22) Filed: Jan. 12, 2024

(65) Prior Publication Data

US 2025/0231679 A1      Jul. 17, 2025

(51) Int. Cl.
| | |
|---|---|
| *G06F 3/0486* | (2013.01) |
| *G06F 3/04845* | (2022.01) |
| *G06F 3/0488* | (2022.01) |
| *G06F 3/14* | (2006.01) |

(52) U.S. Cl.
CPC ........ *G06F 3/0486* (2013.01); *G06F 3/04845* (2013.01); *G06F 3/0488* (2013.01); *G06F 3/1423* (2013.01)

(58) Field of Classification Search
CPC .. G06F 3/0486; G06F 3/04845; G06F 3/0488; G06F 3/1423; G06F 3/04883
See application file for complete search history.

(56) References Cited

U.S. PATENT DOCUMENTS

| | | | |
|---|---|---|---|
| 8,803,816 B2 | 8/2014 | Kilpatrick, II et al. | |
| 9,207,717 B2 | 12/2015 | Sirpal et al. | |
| 11,138,949 B2 | 10/2021 | Iyer et al. | |
| 2005/0093868 A1* | 5/2005 | Hinckley | H04W 4/21 |
| | | | 345/506 |
| 2013/0082947 A1* | 4/2013 | Chang | G06F 1/1643 |
| | | | 345/173 |
| 2014/0285449 A1 | 9/2014 | Cho et al. | |
| 2015/0186029 A1* | 7/2015 | Khani | G06F 3/1423 |
| | | | 345/173 |
| 2017/0228207 A1 | 8/2017 | Szeto et al. | |
| 2018/0069053 A1* | 3/2018 | Bok | H10K 50/826 |

(Continued)

FOREIGN PATENT DOCUMENTS

| | | |
|---|---|---|
| CN | 105074618 A | 11/2015 |
| CN | 111124040 A | 5/2020 |

OTHER PUBLICATIONS

Foley, Margaret et al., "Switching Between Standard Pointing Methods with Current and Emerging Computer Form Factors," CHI' 2022, Apr. 29-May 5, 2022, 14 pages.

(Continued)

*Primary Examiner* — Jonathan A Boyd
(74) *Attorney, Agent, or Firm* — Slater Matsil, LLP

(57) ABSTRACT
Methods and devices for tracking continuous touch events, such as drag operations, across adjacent capacitive touch surfaces. The adjacent capacitive touch surfaces may include a foldable touch screen having a hinged area between the two capacitive touch surfaces. The adjacent capacitive touch surfaces may include separate touch screens separated by a gap. The methods and devices may enable hover detection, predictive continuation of a touch operation, and simultaneous touch resolution.

19 Claims, 11 Drawing Sheets

400

(56) References Cited

U.S. PATENT DOCUMENTS

| 2020/0136668 A1 | 4/2020 | Chu et al. |
| 2023/0039953 A1 | 2/2023 | Seger, Jr. et al. |

OTHER PUBLICATIONS

Hennecke, Fabian et al., "How Screen Transitions Influence Touch and Pointer Interaction Across Angled Display Arrangements," CHI' 2012, Session: Curves & Mirages: Gestures & Interaction with Nonplanar Surfaces, May 5-10, 2012, 4 pages.
Weiss, Malte et al., "BendDesk: Dragging Across the Curve," ITS 2010: Displays, Nov. 7-10, 2010, 10 pages.

* cited by examiner

200

Break

300

800

802

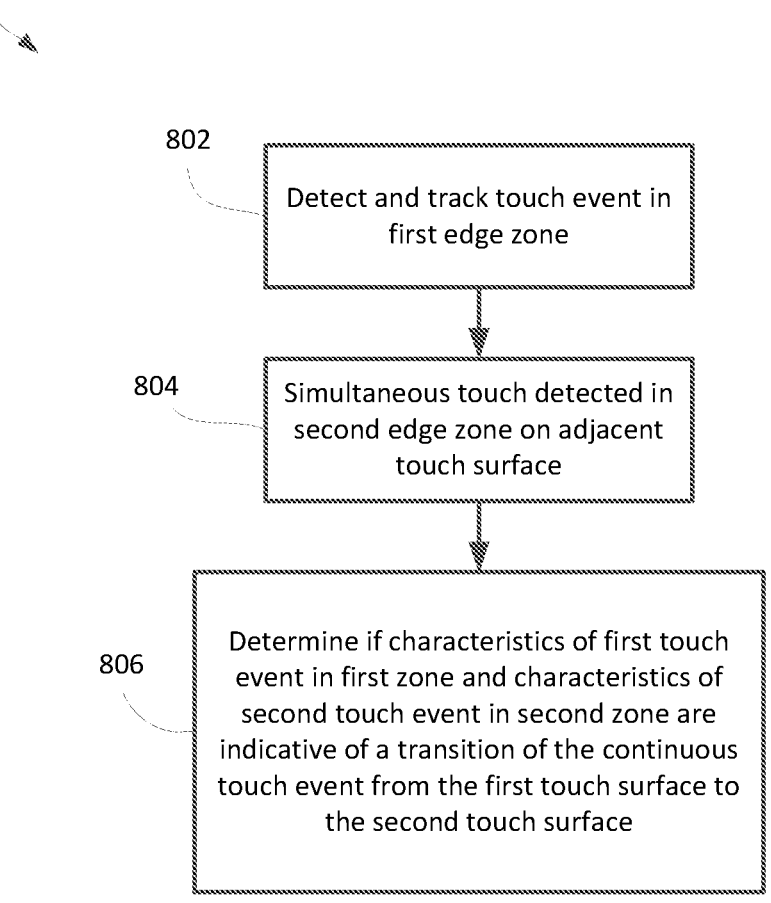

Detect and track touch event in first edge zone

804

Simultaneous touch detected in second edge zone on adjacent touch surface

806

Determine if characteristics of first touch event in first zone and characteristics of second touch event in second zone are indicative of a transition of the continuous touch event from the first touch surface to the second touch surface

FIG. 8

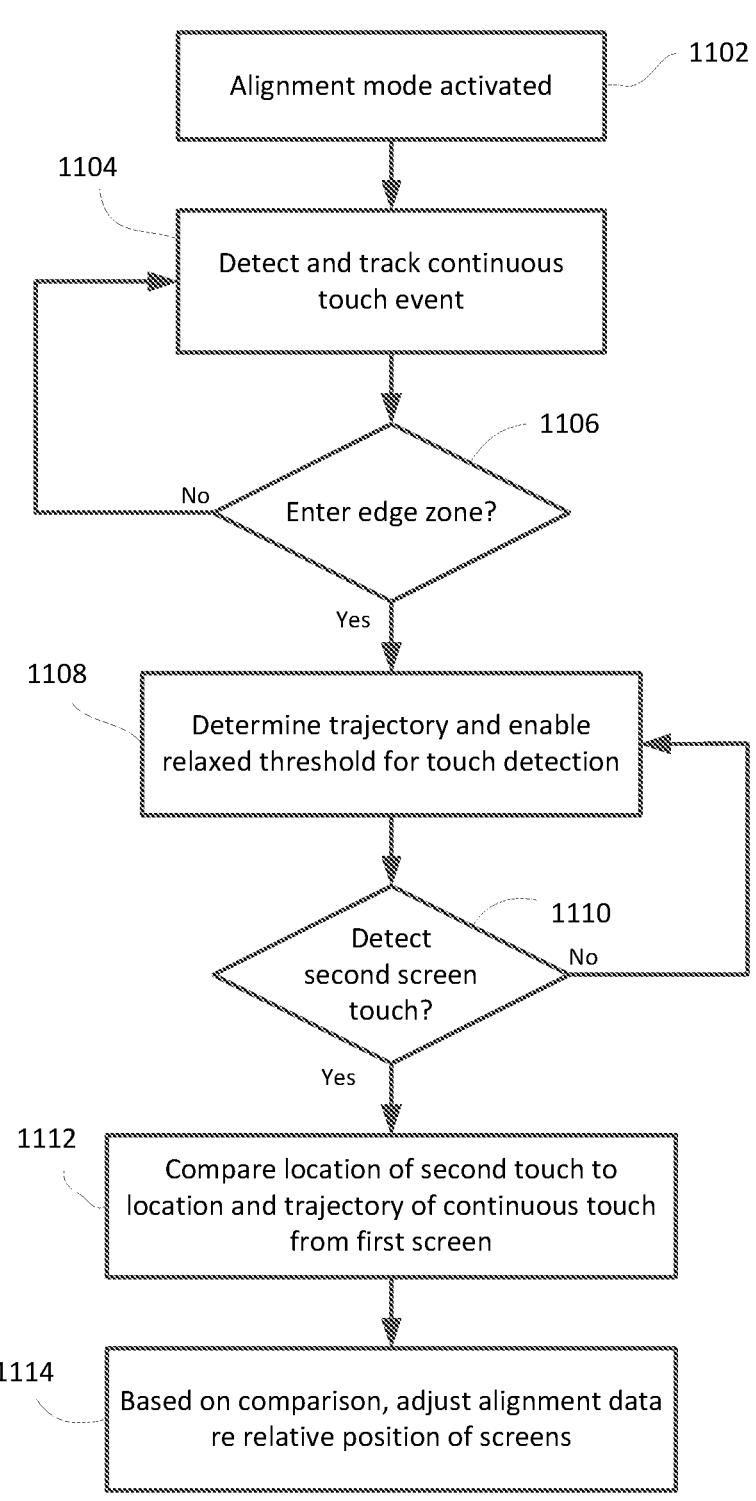

1100

1102 Alignment mode activated

1104 Detect and track continuous touch event

1106 Enter edge zone?

No

Yes

1108 Determine trajectory and enable relaxed threshold for touch detection

1110 Detect second screen touch?

No

Yes

1112 Compare location of second touch to location and trajectory of continuous touch from first screen 1114 Based on comparison, adjust alignment data re relative position of screens

FIG. 11

ADJACENT CAPACITIVE TOUCH SCREEN EVENT TRACKING

FIELD

The present application relates to capacitive touch screens and, in particular, to tracking continuous touch events across adjacent capacitive touch screens, including foldable touch screens.

BACKGROUND

Touch screen technology is becoming increasingly prevalent in a variety of devices. In many situations, a device or combination of devices may incorporate two or more touch screens. In some cases, those screens are coupled together in some manner, such as being hinged together as in the case of a laptop or a two-screen tablet device that may at times function as single large touch screen. In some cases, the screens are in separate casings but are used together with a computing device, such as a set of adjacent touch screen monitors.

More recently, developments have occurred in connection with foldable touch screens, where the screen is formed as a single screen, but with a hinged area at which the substrate is sufficiently thin and malleable to enable bending or hinging between the two adjacent portions of the foldable touch screen.

Touch operations that cross the boundary between separate screens, or that extend through a hinged portion of a foldable or bent screen, can produce anomalies and undesirable results. As an example, a drag operation in which a user selects an icon or other item on one screen with the intention of 'dragging' it to a location on the other screen using a continuous touch drag movement often fails at the interface between the screens or at the hinge area. It would be advantageous to provide for improved methods and devices for addressing at least some shortcomings in current devices.

BRIEF DESCRIPTION OF THE DRAWINGS

Reference will now be made, by way of example, to the accompanying drawings in which:

FIG. 8 shows, in flowchart form, one example method for detecting a continuous touch event across adjacent touch screens involving simultaneous touch events on the respective screens;

FIG. 11 shows, in flowchart form, one example method of using capacitive touch events for adjacent screen alignment;

Like reference numerals are used in the drawings to denote like elements and features.

DETAILED DESCRIPTION

Figure 1A:
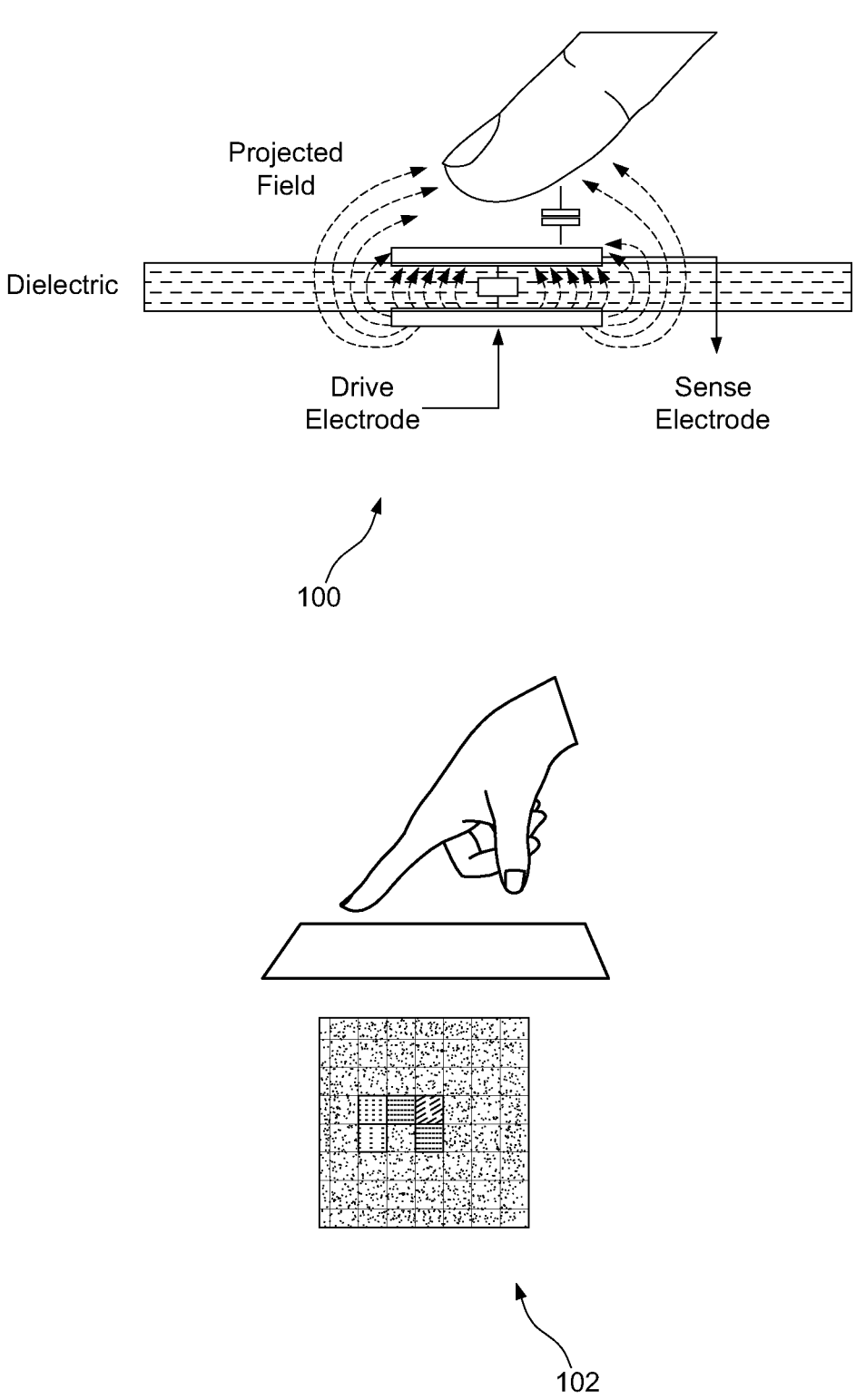
FIGS. 1A and 1B illustrate capacitive touch detection and, in particular, hover-based detection using capacitive coupling.

In one aspect, the present application describes a method of tracking drag interaction with adjacent touch screens. The method may include tracking, through a first capacitive touch surface, a continuous touch event; during the continuous touch event, determining that a touch event location enters a first edge zone proximate a second capacitive touch surface; and while the touch event location is in the first edge zone, using a relaxed threshold for tracking the continuous touch event and detecting its transition to the second capacitive touch surface.

In some implementations, using the relaxed threshold includes predicting, based on a trajectory for the continuous touch event, a location on the second capacitive touch surface, and detecting a new touch event at that future location within a maximum time window. In some cases, using the relaxed threshold includes detecting a discontinuation of the continuous touch event on the first capacitive touch surface, determining the location on the second capacitive touch surface through projection of the trajectory to the second capacitive touch surface, and detecting the new touch event at that location within the maximum time window.

In some implementations, using the relaxed threshold includes lowering a threshold for determining that capacitive sensor readings constitute a continued touch from a regular threshold to a lower threshold, so as to include a hover event as the continued touch.

In some implementations, using the relaxed threshold includes detecting a simultaneous touch by detecting a second touch event within a second edge zone on the second capacitive touch surface, the first edge zone being adjacent to the second edge zone. Detecting transition of the continuous touch event to the second capacitive touch surface may include determining that the second touch event is within a maximum distance from the continuous touch event on the first capacitive touch surface. Detecting transition of the continuous touch event to the second capacitive touch surface may include obtaining capacitive sensor data regarding the continuous touch event and the second touch event and determining from the capacitive sensor data that the second touch event is a continuation of the continuous touch event.

In some implementations, the capacitive sensor data includes characteristics of a first capacitive shape of the continuous touch event and characteristics of a second capacitive shape of the second touch event, and determining that the second touch event is the continuation of the continuous touch event is based on the characteristics of the first capacitive shape and the characteristics of the second capacitive shape. In some cases, the characteristics of the first capacitive shape and the characteristics of the second capacitive shape indicate the first capacitive shape has a decreasing parameter and the second capacitive shape has an increasing parameter. The capacitive sensor data may include sensor values for a grids of sensor locations, and characteristics of the first capacitive shape and the characteristics of the second capacitive shape may include magnitude of the sensor values and location of the sensor values.

In some implementations, detecting the simultaneous touch includes determining that the simultaneous touch is the continuous touch event by predicting, based on a trajectory for the continuous touch event, a future location on the second capacitive touch surface, and determining that the simultaneous touch is at that future location.

In some implementations, the first capacitive touch surface and the second capacitive touch surface are connected by a hinged capacitive touch surface, and the first capacitive touch surface, the second capacitive touch surface and the hinged capacitive touch surface form a single foldable touch screen.

In some implementations, the first capacitive touch surface and the second capacitive touch surface are separated by a gap.

In a further aspect, the present application describes a computing device that includes a processor and memory storing processor-executable instructions that, when executed by the processor, are to cause the processor to carry out one or more of the methods described herein.

According to another aspect, the present application discloses a non-transitory computer readable storage medium containing computer-executable instructions which, when executed, configure a processor to carry one or more of the methods described herein.

Other aspects and features of the present application will be understood by those of ordinary skill in the art from a review of the following description of examples in conjunction with the accompanying figures.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements. The term "and/or" is intended to indicate that either of the two elements may be included or both of the elements may be included.

Modern touch screen technology often employs capacitive sensing. In capacitive touch screens a matrix or grid of sensors (sense electrodes) produce a small localized electromagnetic field at or near the surface of the screen. When a finger (or stylus) is brought into contact with the screen, it impacts the electromagnetic field in a manner that is measurable by the underlying sensor(s). In particular, it capacitively couples with the electrode and thereby produces a change in the electromagnetic field that is reflected in a change in measurable electrical parameters within the electrical circuit of the capacitive sensor. Each node or sensor of the matrix or grid may provide a sensor reading. By evaluating the intensity or amplitude of received sensor readings from the various nodes of the grid or matrix, a computing device can determine whether a touch event has occurred. The device may compare the readings to a threshold level and if the readings exceed a threshold level in a particular area, then it may indicate a touch event.

FIG. 1A diagrammatically illustrates a capacitive touch sensor 100. As shown, when a finger is brought into close proximity of the capacitive touch sensor 100, it interacts with the electromagnetic field, thus producing a measurable change in electrical parameters within the sensor 100. With the threshold set low enough for classifying a reading as a touch event, a capacitive touch screen may detect a touch before the finger makes contact with the touch screen. This may be termed a "hover" event in some cases.

Figure 1B:
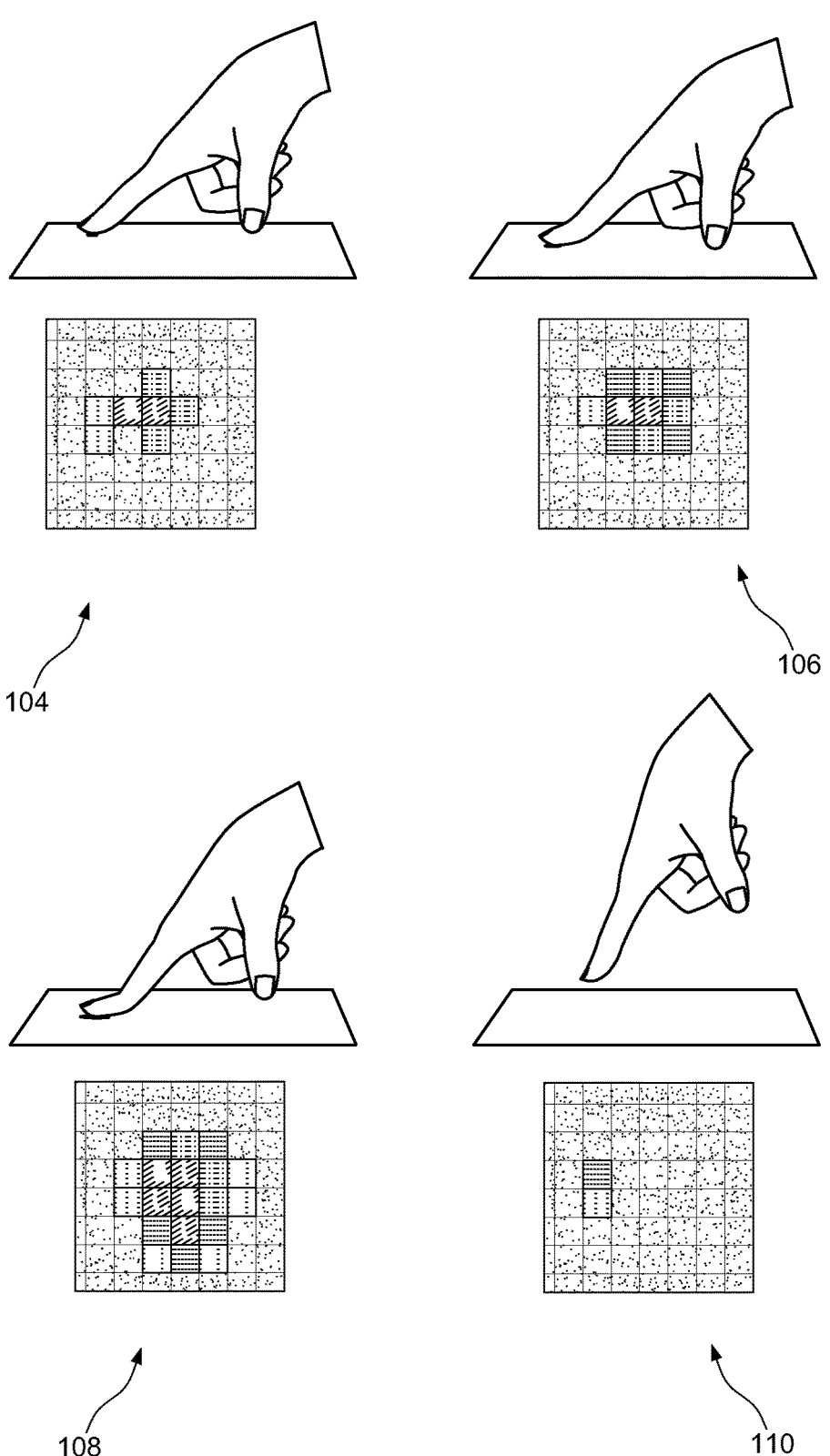

FIG. 1A further graphically illustrates a grid of capacitive sensor, showing detection of a hover event. The differently shaded pixels indicate different magnitude values detected using the capacitive sensors at those locations. Reference is now also made to FIG. 1B. FIG. 1B illustrates a progression of sensor readings corresponding to a touch event, from hover, to light touch, to heavy touch, to release. The various sensor readings may be referred to as forming a capacitive shape, as graphically illustrated by the differently shaded pixels of the grid of sensor locations.

In a first stage 102, a user's finger descends towards a touch screen. The readings corresponding to the first stage 102 show that some of the sensors in the grid of sensors have begun to detect presence of the finger proximate to the screen, as illustrated by the different shading shown in some pixels. In a second stage 104, the user makes initial light contact with the touch screen. It will be noted that more sensors in the region of the touch point exhibit a noticeable change in value as indicated by the shading of the pixel grid. In the third stage 106, the finger makes full contact with the touch screen. It will now be noted that a significant portion of nine or more of the sensors show a noticeable reading signalling a touch event. In the fourth stage 108, the finger is pressed harder, flattening it out and causing even more sensors to detect the presence of the finger. In any of these cases, the device may determine the precise location of the touch based on an algorithm for finding a center point of the touch using the readings from the various sensors. Finally, in a fifth stage 110, the finger is drawn up and away from the touch screen, ending the touch event. It may be noted that one or two sensors still produce a faint reading from capacitive coupling of the tip of the finger as it is raised away from the screen.

Touch operations that cross the boundary between separate screens, or that extend through a hinged portion of a foldable or bent screen, can produce anomalies and undesirable results. As an example, a drag operation in which a user selects an icon or other item on one screen with the intention of 'dragging' it to a location on the other screen using a continuous touch drag movement often fails at the interface between the screens or at the hinge area. For the purposes of discussion herein, a foldable screen will be referred to as involving two adjacent touch screens, although they are a continuous surface. In the case of foldable screens, each touch screen may include a hinge area or zone in the region where the touch screen is intended to bend or fold. This hinge area may be described herein as being made up of respective edge zones or edge areas of the respective portions of the screen. In the case of non-continuous screens, the touch screens may be described as each having an edge zone. The edge zone may be a strip or portion of the touch screen along its edge. It may be a border around the permitter of the touch screen. The edge zone may be a region that abuts a bezel or other casing element, if any. In some cases, the edge zone may simply abut the edge of the glass where the screen physically ends. In the case of a continuous screen, the edge zones include the hinge area, i.e. that portion of the continuous screen that is bendable or foldable.

The hinge area of a foldable touch screen can be a very sensitive area since the materials forming the screen are particularly thin in that region to enable them to bend.

As mentioned above, touch screens can encounter problems with discontinuous or incomplete touch in the edge zone, particularly in the case of a foldable screen where hinge is folded to a significant degree. Currently, touch location is determined as the centroid of a capacitive shape. This can create issues at the hinge area where the shape can have odd dimensions and/or cease to meet minimum requirements for touch event classification. This may lead to dropped drag operations or to the inability to drag from screen to screen. With discontinuous screens, a touch tends to be lifted as an edge of the screen is approached during a drag operation, particularly if there is a bezel and there will be a discontinuity in the touch as a finger is lifted or slides off one screen before it makes contact with the adjacent screen. In the case of a hinged area, to maintain a touch event in order to drag through the hinge, the temptation is for a user to press harder to ensure the drag continues through the hinge. This is problematic due to the sensitivity of that area where hard presses are undesirable. In the case of adjacent screens at sharper angles with each other, particularly hinged or folded screens, the drag touch event can fail because of dual touch detection where the finger makes contact with both screens at the same time while passing through the angled area. Dual touch events can cause a failure of the drag operation or other anomalous and undesirable results.

Figure 2:
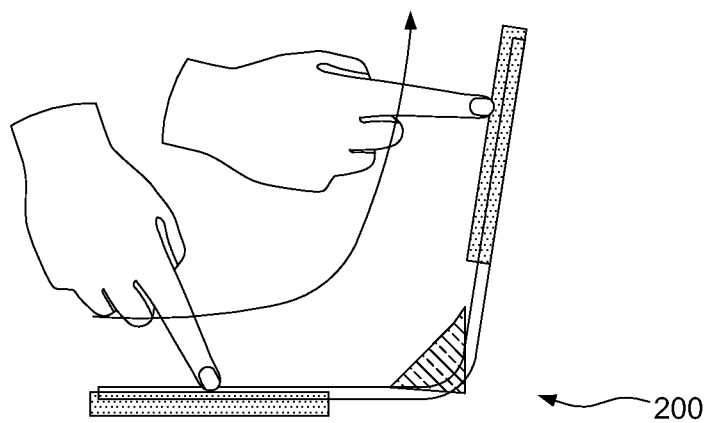
FIG. 2 diagrammatically illustrates a drag operation on a folded touch screen through a hinged area.

To further illustrate various use cases, reference is now made to FIGS. 2 to 5. FIG. 2 shows a side view of a folded device 200 and illustrates drag operation from one screen to another adjacent screen through a hinged area. The folded device 200 may have one continuous and foldable touch screen in some cases, or may have two separate touch screens that are hinged together.

Figure 3:
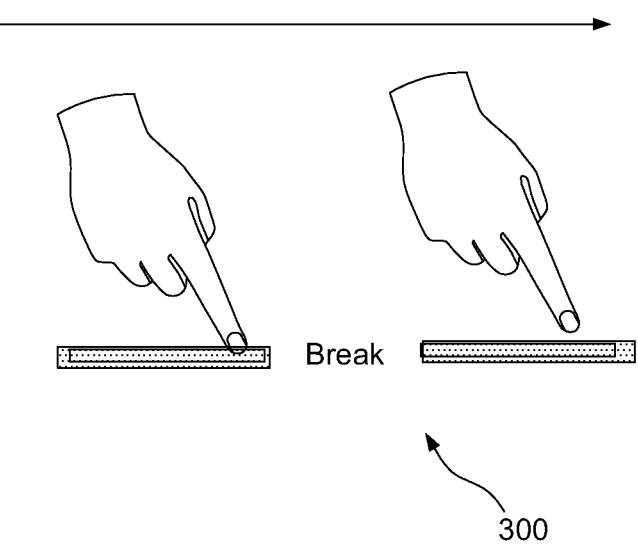
FIG. 3 diagrammatically illustrates a drag operation from one touch screen to an adjacent touch screen.
Figure 4:
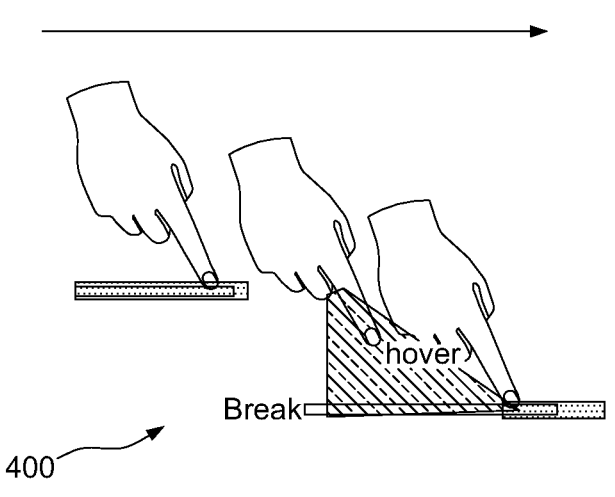
FIG. 4 diagrammatically illustrates a drag operation from one touch screen to nearby but non-adjacent touch screen.
Figure 5:
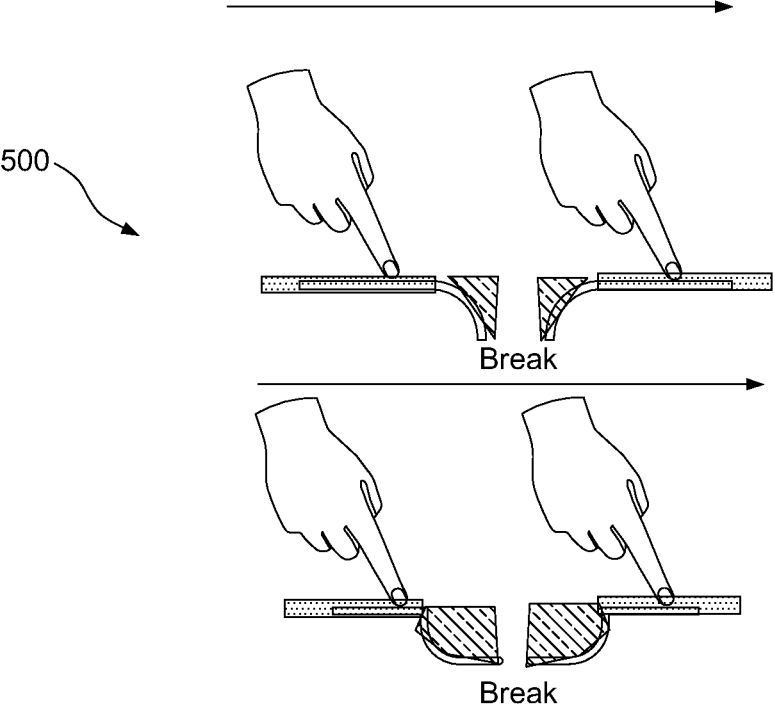
FIG. 5 diagrammatically illustrates a drag operation involving bent, folded, or non-conventional touch screens.

FIG. 3 illustrates a pair of adjacent touch screens 300. A drag operation across one touch screen and onto the other touch screen may pass over the break or gap between the adjacent screens 300. FIG. 4 shows a similar pair of adjacent touch screens 400 in a configuration in which the two screens are not adjacent. That is one of the screens is near, but non-adjacent, to the other screen. FIG. 5 shows a drag operation involving two adjacent but non-conventional touch screen having shaped or folded screen surfaces. In any of these situations, a drag operation may fail at the transition point between one screen and another.

Accordingly, it may be advantageous to provide for methods and devices that address one or more of these shortcomings. In one aspect, the present application provides a variety of methods and devices to enable tracking of a continuous touch event from one screen to another screen. The methods may include tracking, through a first capacitive touch surface, a continuous touch event. During the tracking of the continuous touch event, the device may determine that the location of the event is within \a first edge zone proximate a second capacitive touch surface. While the touch event location is in the first edge zone, the device may use a relaxed threshold for tracking the continuous touch event and detecting its transition to the second capacitive touch surface. In this manner the device may enable detection of hover events as part of the continuation of the continuous touch event. By allowing for hover events, the continuous touch event may not be lost during the transition point from one screen to the other, such when passing through a hinged area or over a gap between adjacent screens. In some cases, the device may further track trajectory of the touch within the edge zone so as to predict timing and location of the continuation of the touch on the adjacent screen. This may enable the device to account for gaps or discontinuities in the touch event and to recognize the new touch on the second screen as a continuation of the touch event on the first screen. Additional mechanisms and techniques are described in the detailed embodiments below.

Figure 6:
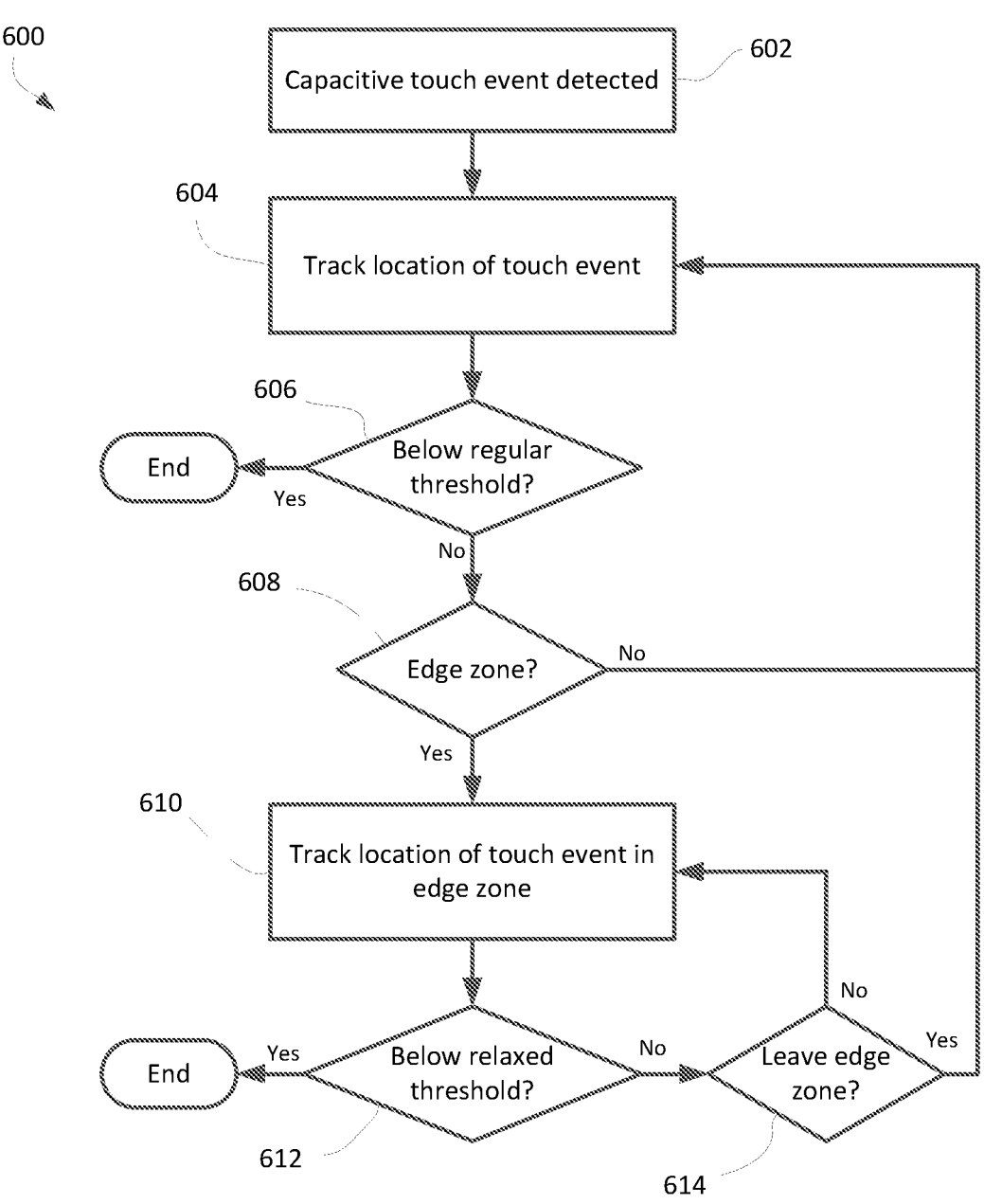
FIG. 6 shows, in flowchart form, one example method of detecting continuous touch events across adjacent screens.

Reference is now made to FIG. 6, which shows, in flowchart form, one example method 600 of detecting continuous touch events across adjacent screens. The adjacent screens may be two parts of a continuous foldable screen in some implementations. The adjacent screens may be two separate screens having a non-touch sensitive edge between them. The edge may be one or more bezels or other parts of a casing. The adjacent screens may be part of a multiscreen devices in which the two screens are housed in a single computing device, such a multiscreen laptop, mobile device, or tablet. In some cases, the adjacent screens may be separate devices, such as two separate touch screen monitors or tablets or other computing devices. In the case of separate devices, the two devices may be paired such that one of the devices receives touch screen data and information from the other device and carries out the method 600 for detecting continuous touch events across the screens of both devices. In the description below the method 600 is described as being carried out by a computing device. The computing device may include an operating system and/or application software executable by one or more processing units to carry out the functions described.

The touch screens include capacitive touch sensors. As will be appreciated, the capacitive touch sensors may output capacitive touch readings or data indicating the intensity or amplitude of capacitive coupling at a grid or matrix of locations on or near the screen surface. The computing device and, in particular, the operating system may include a touch detection routine that receives capacitive touch data and determines whether a touch event is detected and the location of the touch event. This determination may be used by other portions of the operating system or software applications as detected user input. For example, the operating system may be configured to detect a continuous touch event as a drag operation that selects and moves an icon.

Operation 602 reflects the detection of a capacitive touch event. In operation 604, the device determines and tracks the location of touch event based on the capacitive sensor data. In operation 606, the device determines whether the touch even has ended.

The detection of the capacitive touch event and/or the determination as to whether it has ended or is continuing, may be based on a first threshold or first set of thresholds. The capacitive sensor data may be compared to the first set of thresholds to determine whether the touch event continues to be detected. For example, a condition of detecting the touch event may be that a capacitive sensor reading exceeds the first threshold in its amplitude or intensity measure. In some cases, the condition may include that a minimum number of adjacent readings, e.g. from a grid of pixels/sensor points, forming a capacitive touch shape each exceed a minimum threshold and/or include at least one reading that exceeds a certain threshold. The capacitive touch shape may need to have a minimum size, such as a minimum number of sensor readings above the first threshold in both an x and y direction. Other such conditions or characteristics of the touch event may be used to determine whether the touch event has occurred or is still occurring.

If the device determines in operation 606 that the touch event has ended, for instance if the capacitive sensor readings do not meet the first threshold or first set of thresholds, then the method 600 ends until a new touch is detected. If the touch event was part of a continuous touch operation, such as a drag operation, then the device carries out whatever operations are associated with the end of that operation, such as release of a selected item, repositioning of that item (e.g. icon) at the last location of the touch event, or other such operations.

If the touch event continues, then in operation 608 the device determines whether the location of the touch event is within an edge zone. The touch screen may include one or more defined edge zones. The edge zones may be a certain portion of the screen proximate an edge of the screen or proximate the hinge area of a foldable screen. The edge zone may be defined in terms of x and y coordinates in some cases. The edge zone may be defined in terms of pixel locations in some cases. If the touch event is not within an edge zone, then the method 600 returns to operation 604 and carries on as per normal. However, if the touch event is determined as having entered an edge zone in operation 608, then the device changes the manner in which it evaluates the capacitive sensor data for determining if the touch event continues.

In particular, in operations 610 and 612 the device tracks the location of the touch event and evaluates whether the capacitive sensor data indicates that the touch event continues or has ended; however, the device uses a relaxed threshold for determining whether the touch event continues. In some cases, this includes using a second threshold or second set of thresholds lower than the first threshold or first set of thresholds, i.e. the regular threshold. In some cases, the relaxed threshold may include a lower threshold in terms of intensity or amplitude of the capacitive sensor reading for being classified as touch detection. The lower threshold may include relaxed thresholds for detecting a touch event in terms of the number of adjacent sensor points required to constitute a touch event or the size of the capacitive shape, e.g. the minimum x and y dimensions of the shape. The relaxed thresholds may include thresholds that can be met without physical contact from a finger or stylus, but may be met based on capacitive coupling from a hover event.

If in operation 612 the capacitive sensor data does not meet the relaxed threshold associated with the edge zone, then the device determines that the continuous touch event has ended and it carries out operations associated with the end of the touch event. In tracking the location of the touch event, the device may further determine whether the touch event location has left an edge zone, as indicated by operation 614. If the touch event leaves the edge zone, it may continue on the screen outside of the edge zone, in which case the method 600 returns to operation 604.

Method 600 relies on using a lowered threshold for detecting or classifying touch events when the location of the touch event enters an edge zone. This in part ensures that users are not inclined to press harder in the edge zone, which may prevent damage to a hinge portion of a foldable screen. It may also ensure that a touch event is not terminated unexpectedly when in an edge area because of a partial lifting of a finger as it approaches a screen edge, or if the finger is only partly in contact with the screen because it is at the edge and only a portion of the finger is in contact with the capacitive touch screen. Operations 610 and 612 may be implemented using a number of techniques separately or in combination for detecting a continuous touch and/or determining that certain capacitive sensor data is indicative of a continuous touch event. Various of the techniques may apply to specific scenarios.

Figure 7:
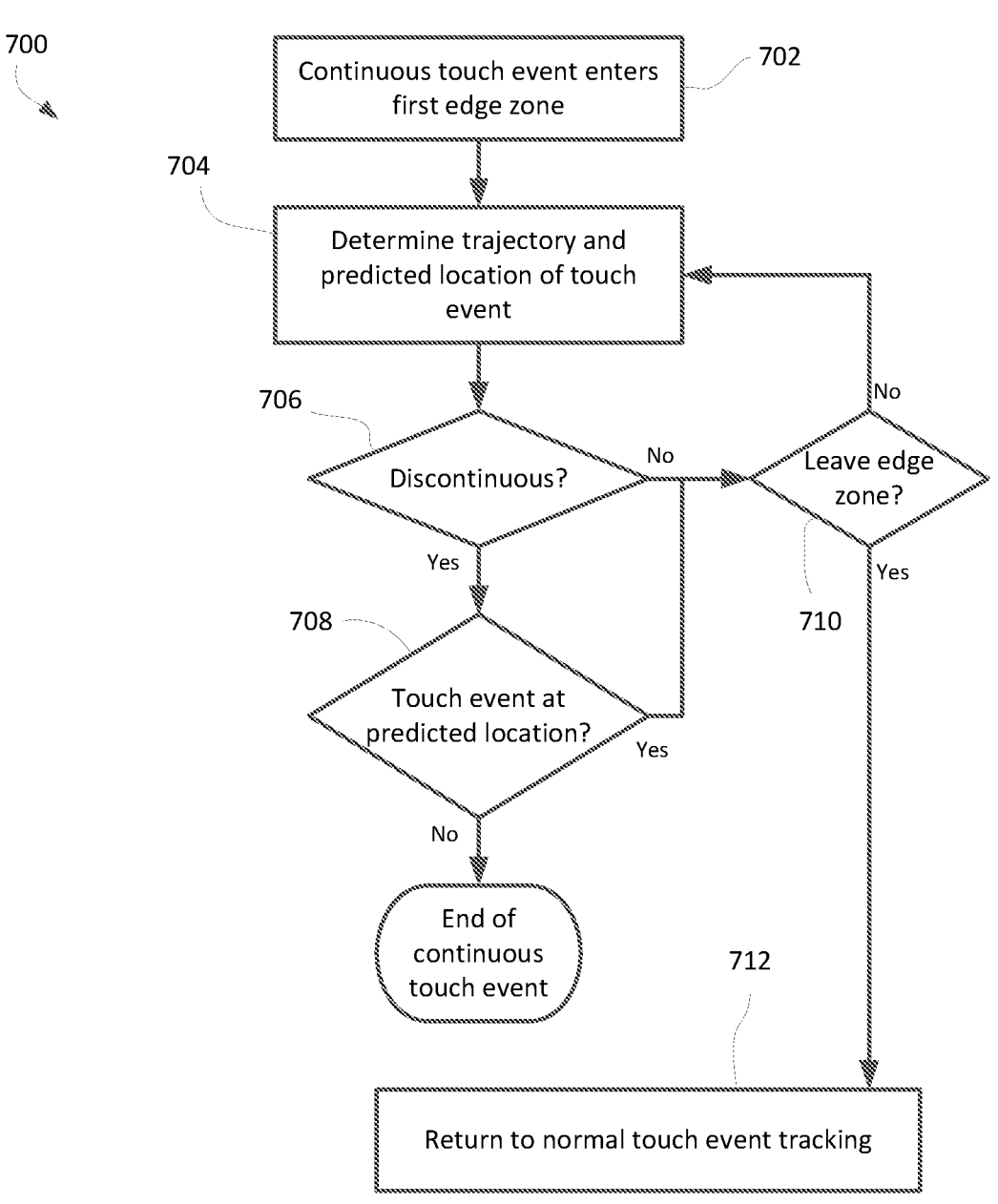
FIG. 7 shows, in flowchart form, one example method for detecting a continuous touch event using predicted location.

FIG. 7 shows, in flowchart form, one example method 700 for detecting a continuous touch event using predicted location. As discussed above, the method 700 may be implemented by a computing device having at least one capacitive touch screen. The method 700 includes determining that the location of a detected touch event has entered a first edge zone of the touch screen. The first edge zone may be a hinged portion of a foldable screen in some cases. The first edge zone may be a border area around the perimeter of the touch screen adjacent to the screen edges.

While the touch event is in the edge zone, the device determines a predicted location for the touch event in operation 704. That is, the device evaluates the current location of the touch event and data regarding the trajectory and/or speed of the touch event. The data may be data received over a window of time, such a series of determined touch locations over a recent window of time. From the series of touch locations and the associated times of those detected events, the device may determine a trajectory and speed of the touch event. This may be used to determine one or more predicted locations at future times. For example, it may result in determination of a predicted touch location at a specific future time, e.g. 10 milliseconds, 0.1 seconds, 1 second, or some other future time.

If the trajectory extends beyond the edge of the touch screen, or through a hinge area of a touch screen, then the device may determine a predicted first location of contact on an adjacent screen and a predicted time of first contact based on projection of the trajectory and speed. The device may therefore detect whether a touch event detected at the adjacent screen should be classified as a continuation of the continuous touch event or whether it constitutes a new touch event, depending on whether the touch occurs at or near the predicted location at or near the predicted time.

The device continues tracking the touch event in the edge zone and updating the predicted location and time. In operation 706, the device determines whether the touch event continues. That is, the device determines from the capacitive sensor data whether the touch event has ceased on the basis that the sensor readings do not meet the relaxed threshold associated with the edge zone. If the touch event continues, then the device determines from the location of the touch event whether the touch has exited the edge zone, as indicated by operation 710. If not, then it continues to update the predicted location and track the touch event. If the touch event has left the edge zone, then the device returns to normal touch event detection in operation 712.

If, in operation 706, the device determines that the touch event has ceased, i.e. discontinued, because the capacitive sensor readings do not meet the relaxed threshold associated with the edge zone, then in operation 708 the device evaluates whether the discontinuity is the end of the touch event or is a mere temporary interruption based on the predicted location.

As indicated by operation 708, following a discontinued touch, the device determines whether a touch event is detected at the predicted location. The device may have a tunable parameter set for evaluating whether a touch event is close enough to the predicted location to be classified as part of the continuous touch event. Operation 708 may further include determining whether the touch event occurs at or near the predicted time. The tunable parameter setting may include a time threshold within which the touch event needs to be detected for it to constitute a continuation of the continuous touch event. This may include determining whether the touch event occurs within a maximum time window. If no touch event is detected, or if the detected touch event is not close enough to the predicted location or close enough to the predicted time, then the device may determine that the continuous touch event has ended.

If a touch event is detected in operation 708 at the predicted location and time, then the device may determine that it the new touch event is part of the continuous touch event that was previously being tracked, and it goes on to operation 710.

One problem that can arise with drag operations and other such continuous touch events in the case of adjacent screens is that a touch event on a first screen may not have ended when a second touch event is detected on the second screen. In some cases, the second touch event may be a distinct touch operation. In that situation, the device may be configured to handle a second separate touch event in a particular manner. For example, the second touch event may cause the first touch event to end if only one touch event is permitted at a time. Alternatively, separate touch events may correspond to particular operations, such a pinch movement causing a zoom function. Accordingly, the second touch event, if inadvertent, may cause unexpected behaviour of the device if it is not truly a separate touch event.

FIG. 8 shows, in flowchart form, one example method 800 for detecting a continuous touch event across adjacent touch screens involving simultaneous touch events on the respective screens. The adjacent touch screens may be a single folded touch screen with two portions joined by a hinged area. The adjacent touch screens may be two separate touch screens having little or no gap between them such that they have edges in very close proximity. The touch screens may be angled relative to each other. In some cases, the touch screens may be hinged relative to each other, such as in a multiscreen foldable tablet.

The method 800 includes determining that the location of a continuous touch event enters a first edge zone in operation 802. The hinged area of a foldable screen, or the screen edges that are proximate to each other in a multiscreen device, may be designated as having an edge zone encompassing the hinged area or a portion of the touch screen along the screen edges.

While the touch event continues in the first edge zone, in operation 804 a multitouch event may be detected in which a second touch event is detected on the adjacent touch screen and/or adjacent portion of a foldable touch screen. The second touch may be detected while the first touch is still detected in the first edge zone. The second touch may be detected in a second edge zone adjacent to the first edge zone but on the adjacent touch screen. If the second touch is elsewhere on the adjacent touch screen, then it may be classified as a true separate touch event and handled accordingly.

In operation 806, the device may determine whether the second touch event is a simultaneous touch event that constitutes a part of the continuous touch event, such as a continuation of a drag operation. The device may use one or more factors to determine whether the second touch is classified as part of the continuous touch event. In one example, the device may determine whether the second touch event is within a threshold distance from the first touch event. That is, if the second touch is sufficiently close to the first touch, then it may be presumed that it is from the same finger or stylus. This is particularly the case with a hinged folded screen in a partly folded configuration, or if the two separate screens are angled towards each other. As the touch event approaches the hinged or bent area, there is a likelihood that a finger dragging towards that area may make contact with the second screen before leaving and losing contact with the first screen. If that second point of contact is within a threshold distance from the first point of contact then there is a strong likelihood that it is part of the same touch event. In some cases, this factor may also take into account the folded condition of the screen(s). That is, the device may determine whether the screens are sufficiently folded or angled relative to each other based on a sensor that detects the screen angles. In some implementations the folded condition of the screens may be a factor in determining whether the second touch is part of a continuous touch event.

An alternative or additional factor may be based on predictive location. As described above, while in the first edge zone, the device may determine the trajectory and speed of a continuous touch event, such that it can determine a predicted future location of the touch event. In the case where the trajectory projects towards the second touch screen, the device may, on detecting a second touch event in the second edge zone on the second screen, determine whether that second touch event is located sufficiently close to the predicted location. That is, it may determine whether the second touch location is within a threshold distance of a line of trajectory as a condition of classifying it as part of the continuous touch event.

A further or alternative factor may be based on detailed capacitive sensor data from the two touch events. That is, the device may evaluate the capacitive touch sensor data for the first touch event and the second touch event to determine whether one or more characteristics of that data indicate that the second touch event is part of the continuous touch event. The one or more characteristics may include size parameters for the touch events. For example, the x and/or y size of the capacitive blob or shape detected at the touch event. In one example, the device may determine whether the first capacitive shape is decreasing in size and whether the second capacitive shape is increasing in size, which may correspond to a drag operation in which a finger or stylus is in the process of being lifted or leaving the first touch screen and beginning to have contact with the second touch screen.

In implementations in which the device uses a relaxed threshold for detecting touch events in the hinge or edge areas, there is a higher likelihood of detecting simultaneous touch events during which a touch event is detected on two adjacent screens at the same time. This is particularly the case when the relaxed threshold is set so as to detect hover events as touch events. When screens are angled towards each other, such as in the case of a foldable touch screen, even as a finger or stylus approaches the edge or hinge point of a first touch screen and remains in contact with that first touch screen, it may have entered a hover position with regard to the second touch screen and may cause detection of a second touch event on that second touch screen. Accordingly, the method 800 may provide a mechanism for ensuring that second touch events that are properly part of a continuous touch event are classed as such.

Figure 9:
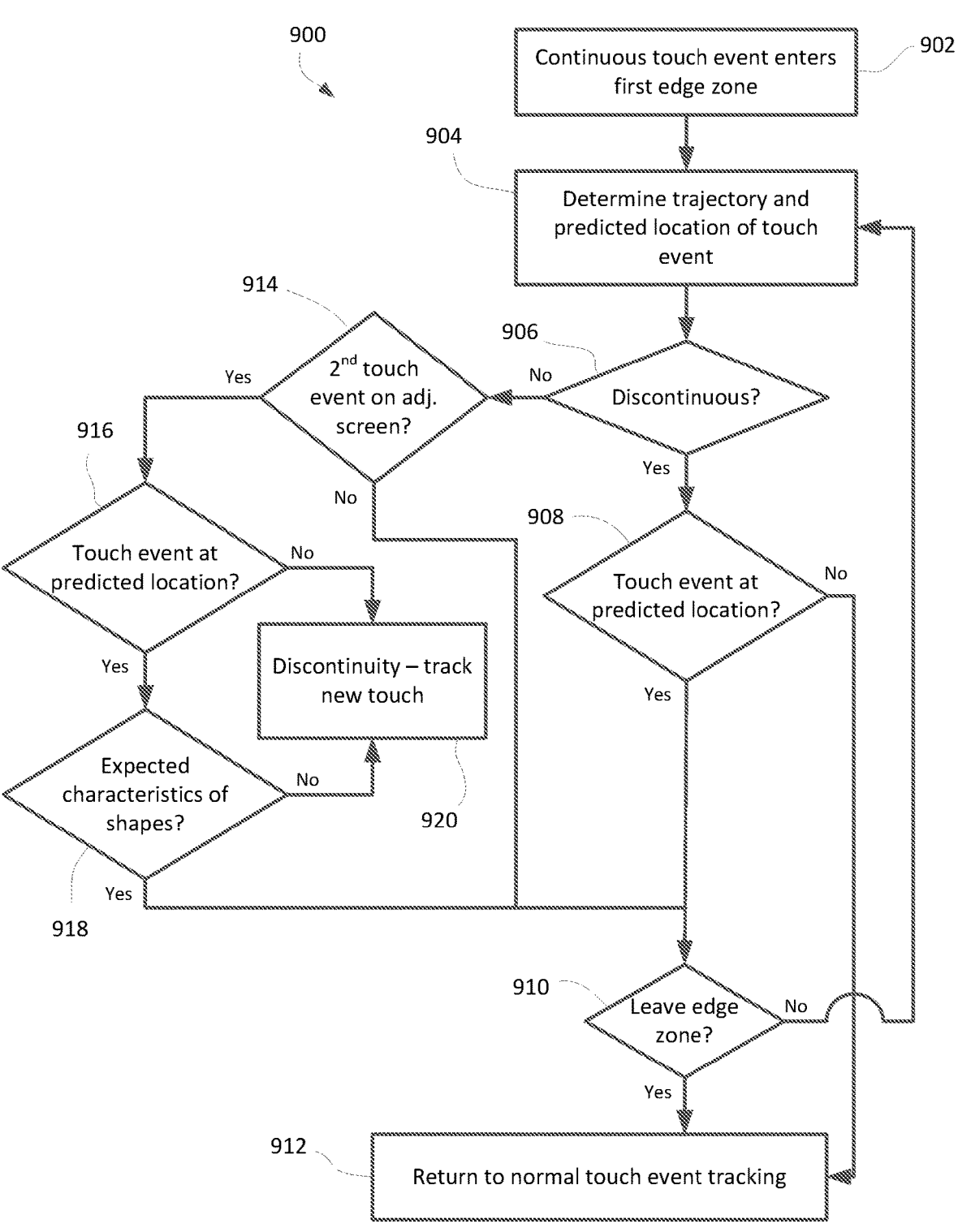
FIG. 9, shows, in flowchart form, another example method for detecting a continuous touch event across adjacent touch screens.

Reference will now be made to FIG. 9, which shows, in flowchart form, one example method 900 for detecting a continuous touch event across adjacent touch screens. The method 900 is implemented within a computing device receiving capacitive touch screen readings or data from at least two adjacent touch screens. The two adjacent touch screens may be two portions of a single foldable touch screen joined by a hinged area of the foldable touch screen. The two adjacent touch screens may be two touch screens within the same computing device, such as two screens in a casing. The casing joining the two screens may be hinged such that the two screens are angled with regard to each other in some cases. In some cases, the two adjacent touch screens may be separate but connected to the computing device, such as two separate touch screen monitors. In some cases, the two adjacent touch screens may be in two separate computing devices that have been paired, and one of the computing devices may be configured to relay capacitive touch screen data to the other computing device that carries out the method 900.

In operation 902 the device determines that a continuous touch event location enters or is within a first edge zone. In operation 904, the device determines a predicted location or trajectory for the continuous touch event. The trajectory may indicate that the continuous touch event is towards an adjacent screen.

In operation 906, the device assesses whether the continuous touch event has ceased. That is, it determines from the capacitive touch sensor data whether the relaxed threshold for detection of a touch event is no longer met. This may be the case if a finder or stylus has been lifted from the screen to the point where it does not capacitively couple enough to constitute a detected touch event. If such a discontinuity in the continuous touch event occurs, then in operation 908 the device determines whether it detects a new touch event at the predicted location. That is, the prediction determined in operation 904 may indicate the expected trajectory or location of the continuous touch event at a future time. In operation 908 the device determines whether a new touch event is detected in that location at that time. In other words, if a new touch event is detected, then the device assesses whether it is sufficiently close to the predicted location that is it classified as a continuation of the earlier-identified continuous touch event. The determination of "sufficiently close" may be based on a threshold maximum distance between the detected location and the predicted location. It may further be based on a time threshold. That is the new event may need to be detected within a certain time window of the discontinuity. If the new touch event is classified as part of the continuous touch event, then the device proceeds to operation 910 to continue tracking the continuous touch event and determining whether its location has exited the first edge zone or a second edge zone of an adjacent screen. If the event location leaves the edge zone(s), then the device returns to touch tracking in the normal course in operation 912. If not, then it continues with the edge zone touch tracking of the method 900.

If there is no discontinuity in the continuous touch event detected in operation 906, the device determines whether a second touch event is detected on an adjacent screen in operation 914. If not, then the device carries on with tracking the continuous touch event within the first edge zone. However, if a second touch event is detected, then the device determines whether the second touch event is part of the continuous touch event or is a separate touch event. To do so, in this embodiment, in operation 916 the device determines whether the second touch event has been detected at the predicted location. As noted above, the device may determine a trajectory for the continuous touch event and that trajectory may project into the adjacent touch screen. If the second touch event is at a location sufficiently close to the trajectory in the adjacent touch screen, then it may be part of the continuous touch event. In some cases, the prediction may specify a series of times and prediction locations. In some cases, the prediction specifies a predicted location and/or trajectory and if the second event is detected close to that predicted location within a threshold time, then it is considered part of the continuous touch event.

In another embodiment, operation 916 may determine whether the location of the second touch event on the second screen is within a threshold distance from the location of a first touch event on the first screen. If so, then it may be classified as part of the continuous touch event, but if too far apart, then it may not be so classified.

If in operation 916, the second touch event is determined not to be part of the continuous touch event, then in operation 920 the device classifies the second touch as a separate touch event and handles it accordingly.

In operation 918, the device may evaluate whether the simultaneous touch events have expected characteristics in terms of their respective capacitive sensor data. In one example, the device may determine from the capacitive sensor data whether the size of the first touch event is shrinking and whether the size of the second touch event is growing, thereby indicating that the simultaneous touch is part of a transition from the first screen to the second screen. This may occur at a hinged area for example, or may occur as a finger slides off of the edge of one screen and onto the edge of the adjacent screen. In either case, the size of the contact area on the first screen will decrease over time and the size of the contact area on the second screen will increase over time. Operation 918 may determine from the characteristics of the capacitive sensor data whether that phenomenon is present.

In some cases, rather than size, the characteristic may include amplitude or intensity of the capacitive sensor reading. That is, the first touch event sensor data may become less intense as the user's finger is pulled off or away from the first screen and the second touch event sensor data may become more intense as the user's finger approaches and makes physical contact with the second touch screen. Accordingly, the amplitude or intensity of the respective capacitive touch sensor data may be use instead of or in addition to capacitive touch shape data, such as x-y size data of the touch events.

If the touch event characteristics do not correspond to a transition from the first screen to the second screen, then in operation 920 the device classifies the second touch as a separate touch event and handles it accordingly. However, if the characteristics are consistent with a transition, then the device treats the second touch event as part of the continuous touch event and carries on with tracking of the continuous touch event in accordance with the method 900.

As noted previously, the hinged area of a foldable touch screen may be a sensitive area more prone to damage than other areas of the touch screen due to the physical characteristics of the screen in that area that enable it to fold and bend. One advantage of using a relaxed threshold for detection of touch events in the hinged area is to discourage users from pressing too hard on the capacitive surface in that zone. Nevertheless, it may be advantageous to further discourage hard presses in that area.

Figure 10:
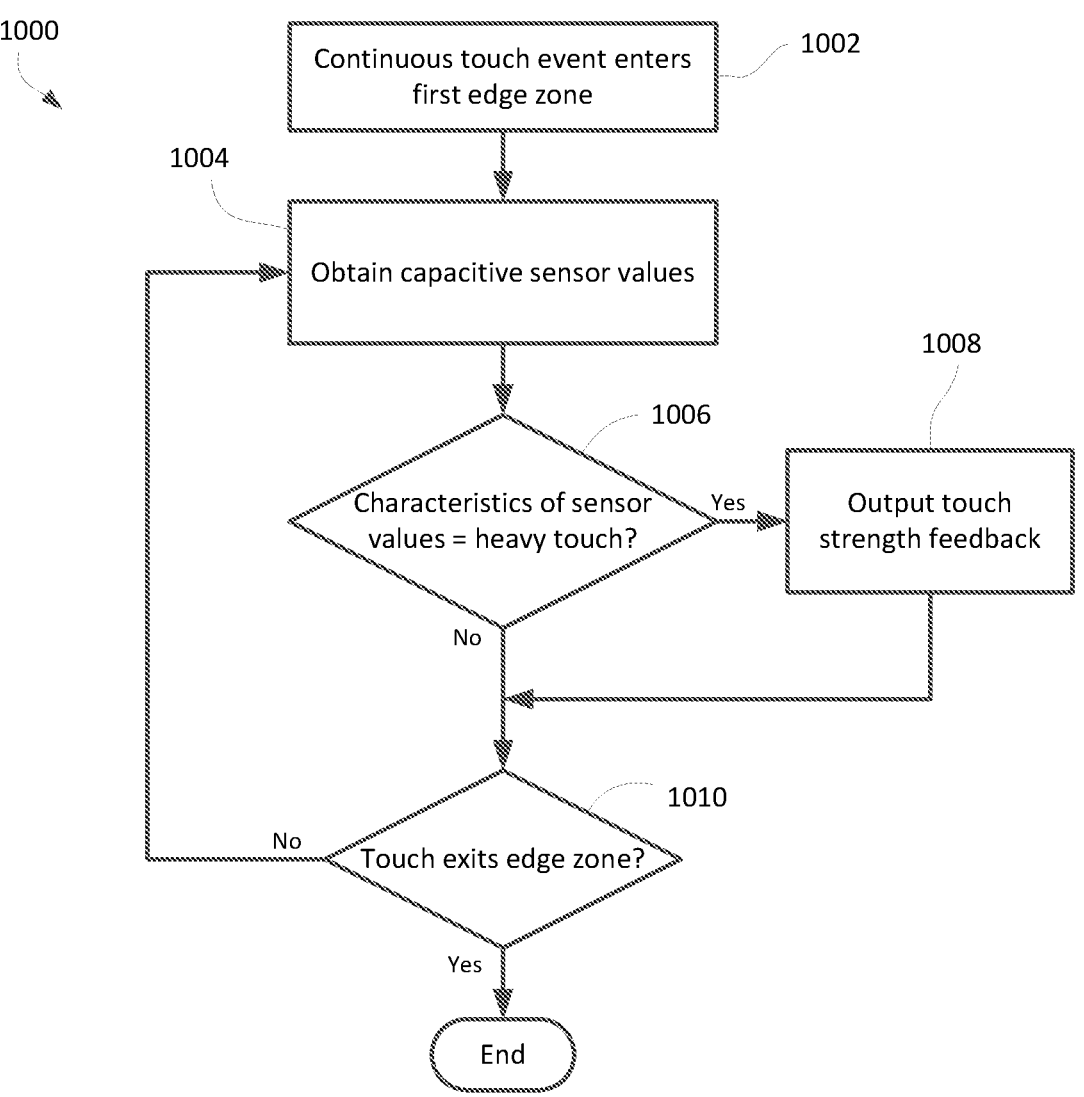
FIG. 10 shows one example method of discouraging damage to the hinged area of a foldable capacitive touch screen.

Reference is now made to FIG. 10, which shows one example method 1000 of discouraging damage to the hinged area of a foldable capacitive touch screen. The method 1000 includes detecting that a touch event is within, or crossed into, an edge zone. The edge zone may be a portion of the touch screen that includes a hinged area. It may include a band or section of touch screen immediately adjacent to the hinged area.

In operation 1004, the device obtains capacitive sensor values from a capacitive touch screen subsystem. The value may include an average value, a maximum value, or individual values from a grid of capacitive touch sensor. In operation 1006 the device determines whether the capacitive touch screen sensor values indicate a heavy touch or heavy press. That is, the device determines from the values whether the user is pressing too hard on the screen. The determination may include determining whether a value or set of values exceed a maximum threshold value indicative of a heavy press, in some cases.

If the touch is classified as a heavy touch in operation 1006, then in operation 1008 the device may output an auditory and/or visual indicator to provide feedback to a user that the touch is exerting too much pressure. The device continues to monitor the touch event and provide feedback provided the event continues within the edge zone, as indicated by operation 1010.

The determination of whether a touch is heavy or not in operation 1006 may take into account a history of user interaction with the device. For example, the device may maintain a distribution of historical capacitive touch intensity data. The mean or median value of touch intensity may be determined to be a normal touch pressure such that detection of a value with more than a present deviation from the normal value may be determined to be a heavy touch. For example, if the device maintains a distribution of capacitive touch intensity data, a touch more than two standard deviations higher than the mean value may be classified as a heavy touch. Other thresholds may be used in other implementations.

In some implementations, the device may employ machine learning, such as a deep neural network model to determine whether current touch sensor data in the edge zone is to be classified as a heavy touch. Normal interactions with the screen may be used in training and updating the neural network model, in some cases, so as to tune it to the user's typical use of the device.

In one alternative embodiment, instead of determining in operation 1006 whether the touch is a heavy touch or not, the device may provide constant visual and/or auditory feedback whenever the touch is in the edge zone to signal the degree of pressure being applied. That is, the capacitive touch values may be used to determine a pressure level and the visual and/or auditory feedback may be modified to reflect that pressure level. For example, in the case of visual feedback, the device may output a halo, glow, or other light-based visual indicator around the location of the touch. The size and/or colour of the visual indicator may be modified based on the pressure level. For example, at low pressure, the visual indicator may be small and white. As the touch pressure increases, the visual indicator may be displayed in a progressively larger size and/or different colour. For instance, the visual indicator may grow larger and gradually turn from white to pink to red as the pressure increases. In the case of an auditory feedback, the audio output may be increased in volume and/or frequency as the pressure increases.

FIG. 11 shows, in flowchart form, one example method 1100 of using capacitive touch events for adjacent screen alignment. This example method 1100 applies some of the capacitive touch sensing discussed above for the purpose of determining and/or adjusting screen alignment. The method 1100 may be implemented by a computing device having two adjacent touch screens. In some cases, the touch screens may be movable or adjustable, such as in the case of a computing device connected to two monitors, either directly or through a docking station or other hub. Accordingly, in this example the two monitors are not in fixed physical relation to each other by being incorporated into a single casing. They may be moved, adjusted and positioned by a user. In such a situation, it may be advantageous to determine the precise alignment or position of the screens relative to each other so that cross-screen operations, such as multi-screen video, images, drag operations, etc., do not suffer from a visual discontinuity at the interface between the two screens due to misalignment. One such situation may arise, for example, when a bank or grid of screens is being installed or mounted side-by-side or one above the other, with the intention of the combined set of screens showing a unified visual interface, such as in a retail display scenario.

In operation 1102, the computing device activates an alignment mode. Triggering of the alignment mode may be as a result of a user selection within a menu or setting in the operating system. In some cases, the mode is entered as a result of connection of a new touch screen device. That is, upon the device detecting that a new touch screen device has been connected to a video output port, or that there are two or more touch screen devices connected to and that the device does not have alignment data regarding the two or more touch screen devices, it may automatically enter an alignment mode. The alignment mode may include prompting a user to swipe a finger or stylus across the boundary between two screens. This may be indicated visually in some implementations by showing a touch screen prompt and visually signalling that the user should swipe/drag onto the adjacent screen. In some cases, these instructions may be communicated graphically, by way of displayed text, by way of audio instructions, or in a combination of such manners.

In operation 1104, the device detects initiation of a touch screen event on a first screen and tracks the event as a continuous touch event as it continues. In other words, using the capacitive touch sensor grid of the first touch screen, the device detects initiation of the continuous touch event and tracks its location and intensity over time. In operation 1106, the device determines whether the continuous touch event enters an edge zone. As noted above, the edge zone may be a border region or portion of the touch screen proximate its edges.

Once the continuous touch event enters the edge zone, the device may reduce the threshold for detecting continuation of the continuous touch event by using a relaxed threshold. The relaxed threshold may permit the device to continue tracking location of the touch event even if the user's finger is partially lifted as it approaches a screen edge. In some cases, the relaxed threshold is sufficiently low as to enable detection of the continuous touch event when the user's finger ceases to contact the touch screen but is in close proximity, i.e. hovering. The detection of a hover event may suffice to be classified as continuation of the continuous touch event in some cases, particularly as the user reaches the edge of the screen and may lift momentarily due to a bezel or step or casing or other discontinuity between the edge of the first touch screen and the edge of the second touch screen.

Operation 1108 further includes determining a trajectory of the continuous touch event. As the user swipes or drags towards the edge of the first screen, the device tracks location of the event and, from that data, continuously determines a trajectory of the motion. The trajectory may be expressed and stored in a vector form in some cases. In some cases, it may be stored as a screen edge location and angle of departure from the screen edge.

In some implementations, the device may carry out the operations of operation 1108 irrespective of whether the continuous touch event has entered the edge zone.

In operation 1110, the device determines whether a touch event is detected within an edge area of the second screen. If not, then it continues to monitor the continuous touch event on the first screen. However, if a touch event is detected on the second screen it beings tracking that event. In some cases, the touch event may be initiated and tracked on the second screen while the continuous touch event is still detected and occurring on the first screen, particularly if the edges of the two screens are very closely aligned, such that the user's finger may be in contact with both screens at once, or hovering closely over one or both screens.

In operation 1112, the device compares the location of the touch event on the second screen with the location and trajectory of the continuous touch event from the first screen. Based on the trajectory and the location on the second touch screen, the device may determine the relative positioning of the two screens in operation 1114. That is, the location of the touch event on the second screen is correlated to the trajectory such that they intersect, under the assumption that the edges of the two screens are adjacent to each other. On this basis, the device may determine on offset of the second screen relative to the first screen. If the screens are side-by-side, the offset is a y-direction offset. If the screens are one atop the other, then the offset may be an x-direction offset. The offset may be termed 'alignment data'. The alignment data permits the device to adjust video output to the second screen to ensure it will vertically align with the first screen when displayed.

In some cases, the device may have data regarding the spacing or gap between the edges of the two screens, which it may then use when determining the position of the trajectory in the second screen and when determining the y-direction offset. For example, the spacing or gap data may account for a bezel or casing around the edges of the screens. In some cases, the spacing data may be determined based on identifying information for the screen received by the computing device. In some cases, the spacing data may be input by a user through a user interface.

In some implementations, the computing device may determine the spacing between the two screens on the basis of the swipe gesture. That is, when the device monitors the continuous touch event and determines its trajectory in operation 1108, it may further determine the speed of the continuous touch event. When a corresponding touch event is then detected on the second screen, the computing device may determine its trajectory and speed. It may then align the two trajectories and, based on the timing of the detection of loss of contact on the first screen and the detection of start of contact on the second screen, the computing device determines a gap time and transition speed, from which it can determine a distance between the two touch events. Using the trajectory, the locations of the touch events, and the distance between the two events, the device can then determine the relative positioning of the two screens in two dimensions, including any gap between the two touch screens. In this example, the alignment data includes x-direction and y-direction offsets.

The alignment data may be stored and used by the computing device when determining video output to the respective screens; such as, to adjust the location of output that is to span both screens, such as when a drag or swipe operation crosses the screens, or if video output or graphical output spans across the edges of the two screens.

Figure 12:
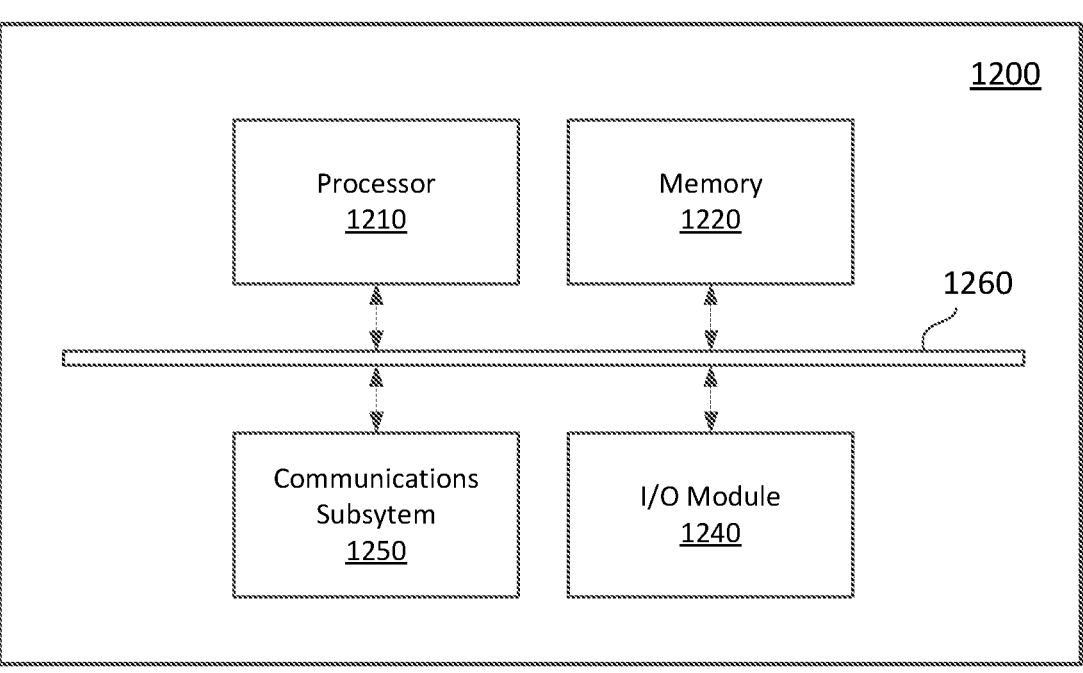
FIG. 12 shows, in block diagram form, one example of a computing device.

FIG. 12 is a high-level diagram of an example computing device 1200. The example computing device 1200 includes a variety of modules. For example, the example computing device 1200 may include a processor 1210, a memory 1220, an I/O module 1240, and a communications module 1250. As illustrated, the foregoing example modules of the example computing device 1200 are in communication over a bus 1260.

The processor 1210 is a hardware processor. The processor 1210 may, for example, be one or more ARM, Intel x86, PowerPC processors, or the like.

The memory 1220 allows data to be stored and retrieved. The memory 1220 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 1200.

The I/O module 1240 allows the example computing device 1200 to receive input signals and to transmit output signal. Input signals may, for example, correspond to input received from a user. Some output signals may, for example, allow provision of output to a user. The I/O module 1240 may serve to interconnect the example computing device 1200 with one or more input devices. Input devices may, for example, include one or more of a touchscreen input, keyboard, trackball or the like. The I/O module 1240 may serve to interconnect the example computing device 1200 with one or more output devices. Output devices may include, for example, one or more display screens such as, for example, a liquid crystal display (LCD), a touchscreen display. Additionally, or alternatively, output devices may include devices other than screens such as, for example, a speaker, indicator lamps (such as, for example, light-emitting diodes (LEDs)), and printers.

The communications module 1250 allows the example computing device 1200 to communicate with other electronic devices and/or various communications networks. For example, the communications module 1250 may allow the example computing device 1200 to send or receive communications signals. As an example, the communication module 1250 may include a network connection, data port, or the like. Communications signals may be sent or received according to one or more protocols or according to one or more standards. For example, the communications module 1250 may allow the example computing device 1200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE), 5G, 6G, or the like.

Additionally, or alternatively, the communications module 1250 may allow the example computing device 1200 to communicate using near-field communication (NFC), via Wi-Fi™, via the Ethernet family of network protocols, using Bluetooth™ or via some combination of one or more networks or protocols. In some embodiments, all or a portion of the communications module 1250 may be integrated into a component of the example computing device 1200. In some examples, the communications module may be integrated into a communications chipset.

Software instructions are executed by the processor 1210 from a computer-readable medium. For example, software may be loaded into random-access memory from persistent storage within memory 1220. Additionally, or alternatively, instructions may be executed by the processor 1210 directly from read-only memory of the memory 1220.

Figure 13:
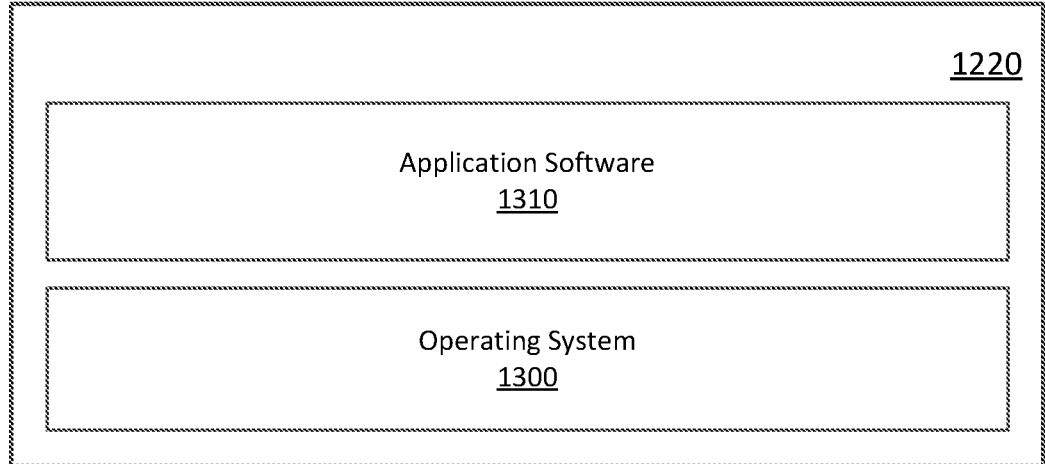
FIG. 13 shows a simplified organization of software components stored in memory of the example computing device.

FIG. 13 depicts a simplified organization of software components stored in memory 1220 of the example computing device 1200. As illustrated, these software components include, at least, application software 1310 and an operating system 1300.

The application software 1310 adapts the example computing device 1200, in combination with the operating system 1300, to operate as a device performing a particular function. While a single application software 1310 is illustrated in FIG. 13, in operation, the memory 1220 may include more than one application software and different application software may perform different operations.

The operating system 1300 is software. The operating system 1300 allows the application software 1310 to access the processor 1210, the memory 1220, the I/O module 1240, and the communications module 1250. The operating system 1300 may, for example, be iOS™, Android™, Linux™, Microsoft Windows™, or the like. The operating system 1300 may be configured to receive capacitive touch screen readings or measurements from a grid or matrix of capacitive touch screen sensors on one or more touch screens.

The application software 1310 and/or operating system 1300 may, when executed, cause the processor 1210 to carry out operations to implement at least some portion of one or more of the methods described herein.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A method of tracking drag interaction with adjacent touch screens, comprising:

tracking, through a first capacitive touch surface, a continuous touch event;

during the continuous touch event, determining that a touch event location enters a first edge zone proximate a second capacitive touch surface; and while the touch event location is in the first edge zone, using a relaxed threshold for tracking the continuous touch event and detecting transition of the continuous touch event to the second capacitive touch surface, wherein using the relaxed threshold includes lowering a threshold for determining that capacitive sensor readings constitute a continued touch from a regular threshold to a lower threshold, so as to include a hover event as the continued touch.

2. The method of claim 1, wherein using the relaxed threshold includes predicting, based on a trajectory for the continuous touch event, a location on the second capacitive touch surface, and detecting a new touch event at that future location within a maximum time window.

3. The method of claim 2, wherein using the relaxed threshold includes detecting a discontinuation of the continuous touch event on the first capacitive touch surface, determining the location on the second capacitive touch surface through projection of the trajectory to the second capacitive touch surface, and detecting the new touch event at the location within the maximum time window.

4. The method of claim 1, wherein using the relaxed threshold includes detecting a simultaneous touch by detecting a second touch event within a second edge zone on the second capacitive touch surface, the first edge zone being adjacent to the second edge zone.

5. The method of claim 4, wherein detecting the transition of the continuous touch event to the second capacitive touch surface includes determining that the second touch event is within a maximum distance from the continuous touch event on the first capacitive touch surface.

6. The method of claim 5, wherein detecting the transition of the continuous touch event to the second capacitive touch surface includes obtaining capacitive sensor data regarding the continuous touch event and the second touch event and determining from the capacitive sensor data that the second touch event is a continuation of the continuous touch event.

7. The method of claim 6, wherein the capacitive sensor data includes characteristics of a first capacitive shape of the continuous touch event and characteristics of a second capacitive shape of the second touch event, and wherein determining that the second touch event is the continuation of the continuous touch event is based on the characteristics of the first capacitive shape and the characteristics of the second capacitive shape.

8. The method of claim 7, wherein the characteristics of the first capacitive shape and the characteristics of the second capacitive shape indicate that the first capacitive shape has a decreasing parameter and the second capacitive shape has an increasing parameter.

9. The method of claim 7, wherein the capacitive sensor data includes sensor values for a grid of sensor locations, and wherein the characteristics of the first capacitive shape and the characteristics of the second capacitive shape include magnitudes of the sensor values and location of the sensor values.

10. The method of claim 4, wherein detecting the simultaneous touch includes determining that the simultaneous touch is the continuous touch event by predicting, based on a trajectory for the continuous touch event, a future location on the second capacitive touch surface, and determining that the simultaneous touch is at that future location.

11. The method of claim 1, wherein the first capacitive touch surface and the second capacitive touch surface are connected by a hinged capacitive touch surface, and wherein the first capacitive touch surface, the second capacitive touch surface and the hinged capacitive touch surface form a single foldable touch screen.

12. The method of claim 1, wherein the first capacitive touch surface and the second capacitive touch surface are separated by a gap.

13. A computing device comprising:

a first capacitive touch surface;

a second capacitive touch surface;

one or more processing units; and memory storing processor-executable instructions that, when executed by the one or more processing units, are to cause the one or more processing units to:

track, through the first capacitive touch surface, a continuous touch event, during the continuous touch event, determine that a touch event location enters a first edge zone proximate the second capacitive touch surface, and while the touch event location is in the first edge zone, use a relaxed threshold for tracking the continuous touch event and detecting transition of the continuous touch event to the second capacitive touch surface, wherein the processor-executable instructions, when executed, are to cause the one or more processing units to use the relaxed threshold by lowering a threshold for determining that capacitive sensor readings constitute a continued touch from a regular threshold to a lower threshold, so as to include a hover event as the continued touch.

14. The computing device of claim 13, wherein the processor-executable instructions, when executed, are to cause the one or more processing units to predict, based on a trajectory for the continuous touch event, a location on the second capacitive touch surface, and to detect a new touch event at that future location within a maximum time window.

15. The computing device of claim 14, wherein the processor-executable instructions, when executed, are to cause the one or more processing units to detect a discontinuation of the continuous touch event on the first capacitive touch surface, determine the location on the second capacitive touch surface through projection of the trajectory to the second capacitive touch surface, and detect the new touch event at the location within the maximum time window.

16. The computing device of claim 13, wherein the processor-executable instructions, when executed, are to cause the one or more processing units to detect a simultaneous touch by detecting a second touch event within a second edge zone on the second capacitive touch surface, the first edge zone being adjacent to the second edge zone.

17. The computing device of claim 16, wherein the processor-executable instructions, when executed, are to cause the one or more processing units to detect the transition of the continuous touch event to the second capacitive touch surface by determining that the second touch event is within a maximum distance from the continuous touch event on the first capacitive touch surface.

18. The computing device of claim 13, wherein the first capacitive touch surface and the second capacitive touch surface are connected by a hinged capacitive touch surface, and wherein the first capacitive touch surface, the second capacitive touch surface and the hinged capacitive touch surface form a single foldable touch screen.

19. A non-transitory computer-readable medium storing processor-executable instructions that, when executed by one or more processors, are to cause the one or more processors to:

track, through a first capacitive touch surface, a continuous touch event, during the continuous touch event, determine that a touch event location enters a first edge zone proximate a second capacitive touch surface, and while the touch event location is in the first edge zone, use a relaxed threshold for tracking the continuous touch event and detecting transition of the continuous touch event to the second capacitive touch surface, wherein using the relaxed threshold includes lowering a threshold for determining that capacitive sensor readings constitute a continued touch from a regular threshold to a lower threshold, so as to include a hover event as the continued touch.

* * * * *